United States Patent
Straub

[11] Patent Number: 6,135,267
[45] Date of Patent: *Oct. 24, 2000

[54] DEVICE FOR CLEANING A TRANSPORT BELT

[75] Inventor: Karlheinz Straub, Heidenheim, Germany

[73] Assignee: Voith Sulzer Papiermaschinen GmbH, Heidenheim, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/008,076

[22] Filed: Jan. 16, 1998

[30] Foreign Application Priority Data

Jan. 23, 1997 [DE] Germany .............. 197 02 196

[51] Int. Cl.[7] .................................................. B65G 45/00
[52] U.S. Cl. .......................................................... 198/495
[58] Field of Search ................ 198/495; 15/256.51; 134/144

[56] References Cited

U.S. PATENT DOCUMENTS

| | | |
|---|---|---|
| 1,793,246 | 2/1931 | Philips ............................ 198/495 |
| 3,680,684 | 8/1972 | Purdy et al. ..................... 198/495 |
| 4,185,399 | 1/1980 | Gladish .......................... 15/256.51 |
| 4,897,203 | 1/1990 | King ............................... 198/495 |
| 4,960,200 | 10/1990 | Pierce ............................ 198/495 |
| 5,031,750 | 7/1991 | Barnes ............................ 198/495 |
| 5,265,537 | 11/1993 | Gasparini et al. ............. 15/256.51 |
| 5,333,724 | 8/1994 | Wingfield et al. ............... 198/495 |
| 5,783,044 | 7/1998 | Schneider et al. .............. 162/278 |

FOREIGN PATENT DOCUMENTS

| | | | |
|---|---|---|---|
| 19539015 | 10/1996 | Germany . | |
| 0038058 | 4/1978 | Japan ............................. | 198/495 |
| 0018228 | 1/1990 | Japan ............................. | 198/495 |
| 406199410A | 7/1994 | Japan ............................. | 198/495 |
| 368144 | 4/1973 | U.S.S.R. ......................... | 198/495 |
| 1041450 | 9/1983 | U.S.S.R. ......................... | 198/495 |
| 2249534 | 5/1992 | United Kingdom ........... | 198/495 |

*Primary Examiner*—Christopher P. Ellis
*Assistant Examiner*—Khot H. Tran
*Attorney, Agent, or Firm*—Greenblum & Bernstein, P.L.C.

[57] ABSTRACT

Device for cleaning the conveyor belt of a machine for producing a cellulosic web. The cleaning device includes a spray unit for discharging cleaning fluid in the opening nip of a roll around which the belt is guided, or at the point where the belt leaves the roll.

15 Claims, 4 Drawing Sheets

DEVICE FOR CLEANING A TRANSPORT BELT

CROSS REFERENCE TO RELATED APPLICATION

This application is related to, and claims priority under 35 U.S.C. § 119 of, German Application No. 197 02 196.4, filed Jan. 23, 1997, the disclosure of which is expressly incorporated herein in its entirety by reference thereto.

BACKGROUND OF THE INVENTION

1. Field of the Invention

The present invention relates to a device for treating, particularly cleaning, a conveyor or transport belt, particularly a dry or wet screen belt or felt belt, of a machine for producing or manufacturing a web, particularly a paper or cardboard web. The device can include one or more nozzles that can be directed against the belt for the purpose of spraying the belt with a gaseous or liquid fluid.

2. Discussion of the Background Information

Devices for cleaning transport belts, such as the device which is disclosed in German Application No. 195 39 015, are known in the art. These devices are situated within a web producing machine, and are used particularly for cleaning fabric belts. These belts become dirty during the operation of the machine; contaminants such as fibers, binding materials, and other aggregates become worked into the stitches and pores of the belts.

To ensure that the transport belt functions properly, it needs to be cleaned. In the prior art it is known for a roll to be provided or associated with a conventional cleaning device, around which the transport belt is guided. The cleaning device is located at the entry area of the roll opening, or on a peripheral area of the roll, where the transport belt rests on the roll's surface. The cleaning device includes a cleaning nozzle that sprays one side of the transport belt with a cleaning agent.

It has been shown that in these instances the cleaning of the transport belt is not always satisfactory; particularly, the side of the transport belt that is not sprayed with the cleaning agent is insufficiently cleaned. This side of the transport belt exhibits unremoved contaminants that can adversely affect the production cycle of a web manufacturing machine. A further disadvantage is that cleaning solution and dirt penetrate the transport belt. Because of the increased moisture content of the transport belt, a rewetting of the web may occur; this can adversely affect the web's properties.

SUMMARY OF THE INVENTION

It is accordingly an object of the present invention to provide a cleaning device for conveyor or transport belts that avoids the disadvantages which characterize the devices of the prior art. Particularly, it is an object of the present invention to provide a cleaning device which cleans both sides of the transport belt in a simple manner, and which demonstrates an improved cleaning effect.

This desired result is achieved with a cleaning device having a cleaning nozzle that is located at or approximately at, or in the area of or approximately in the area of, the opening nip of a roll around which a transport belt is guided. In this regard, the cleaning nozzle can be positioned where or approximately where the transport belt runs off the roll.

Particularly, the cleaning nozzle can be located to spray an agent, particularly a cleaning agent, at or approximately at, or in the area of or approximately in the area of, the opening nip of the roll. Further, the cleaning nozzle can be located to spray the agent where or approximately where the transport belt runs off the roll.

Being thusly situated, the cleaning nozzle sprays the transport belt, as it runs off the roll, with at least one agent, particularly a cleaning agent, whereby dirt on the side of the transport belt that was sprayed with the cleaning agent is dissolved. In addition, cleaning agent, as well as dissolved dirt carried along with the agent, penetrate into and through the transport belt.

The fluid and dirt that penetrate the transport belt can be removed and suctioned off on the opposite side of the transport belt—that is, on the side that was not directly sprayed with the cleaning agent—by a vacuum operating at, or in the area of or approximately in the area of, the opening nip. The vacuum is strengthened by the exiting transport belt and by the roll.

The transport belt is accordingly cleaned on both sides by the cleaning device positioned or situated at or approximately at, or in the area of or approximately in the area of, the opening nip. When compared with previously known devices, the device of the invention demonstrates an improved cleaning effectiveness, whereby fewer disruptions occur when cleaning is conducted during the production of the web, while correspondingly the amount of water which is used is the same, or at least approximately the same.

Preferably, the cleaning device of the invention includes a suction chamber; also as a matter of preference, this suction chamber works in conjunction with the cleaning nozzle. As a matter of particular preference, the suction chamber is associated with, or is positioned with respect to, the cleaning nozzle so that foreign materials—e.g., dirt, and/or vapor or remaining water—are removed from the transport belt by means of the jet; specifically, these materials are vacuumed into the suction chamber, and can be discharged. In this manner, both the cleaning effect of the nozzle and the discharge of filth and the cleaning agent are improved.

In a preferred embodiment of the invention, the cleaning device includes a suction bell which comprises the suction chamber, as a matter of particular preference, the suction chamber is formed by the suction bell. This suction bell partially or completely encompasses or surrounds the cleaning nozzle, in the manner of a sleeve. Accordingly, in this preferred embodiment the cleaning nozzle is situated within, or essentially within or substantially within, the area bounded by the suction bell. In this manner, a compact and integrated construction of a combined nozzle and suction device is achieved.

In a particularly preferred embodiment of the invention, the suction bell extends over at least a portion or section of the peripheral surface of the roll. Additionally or in the alternative, the suction bell preferably extends over and/or beyond the opening nip, as viewed along the direction in which the transport belt runs. As a result, the coarse dirt particles, and/or the contaminant material that clings lightly to the transport belt, can be removed and discharged before the transport belt is sprayed with the cleaning agent.

The intensity and effectiveness of the cleaning provided by the device of the invention are thereby improved. In addition, the amount of filth entering into the transport belt is reduced. The portion or section of the transport belt that extends over the opening nip, which can be pressurized by a suction bell with a vacuum, increases the duration of effective suctioning, thereby also improving the cleaning.

Further embodiments and advantages can be ascertained from the detailed description of the present invention and from the accompanying Figure.

BRIEF DESCRIPTION OF THE DRAWING

The present invention is further described in the detailed description which follows, in reference to the noted drawing by way of a non-limiting example of a preferred embodiment of the present invention, and wherein.

DETAILED DESCRIPTION OF THE PREFERRED EMBODIMENTS

Figure 1:
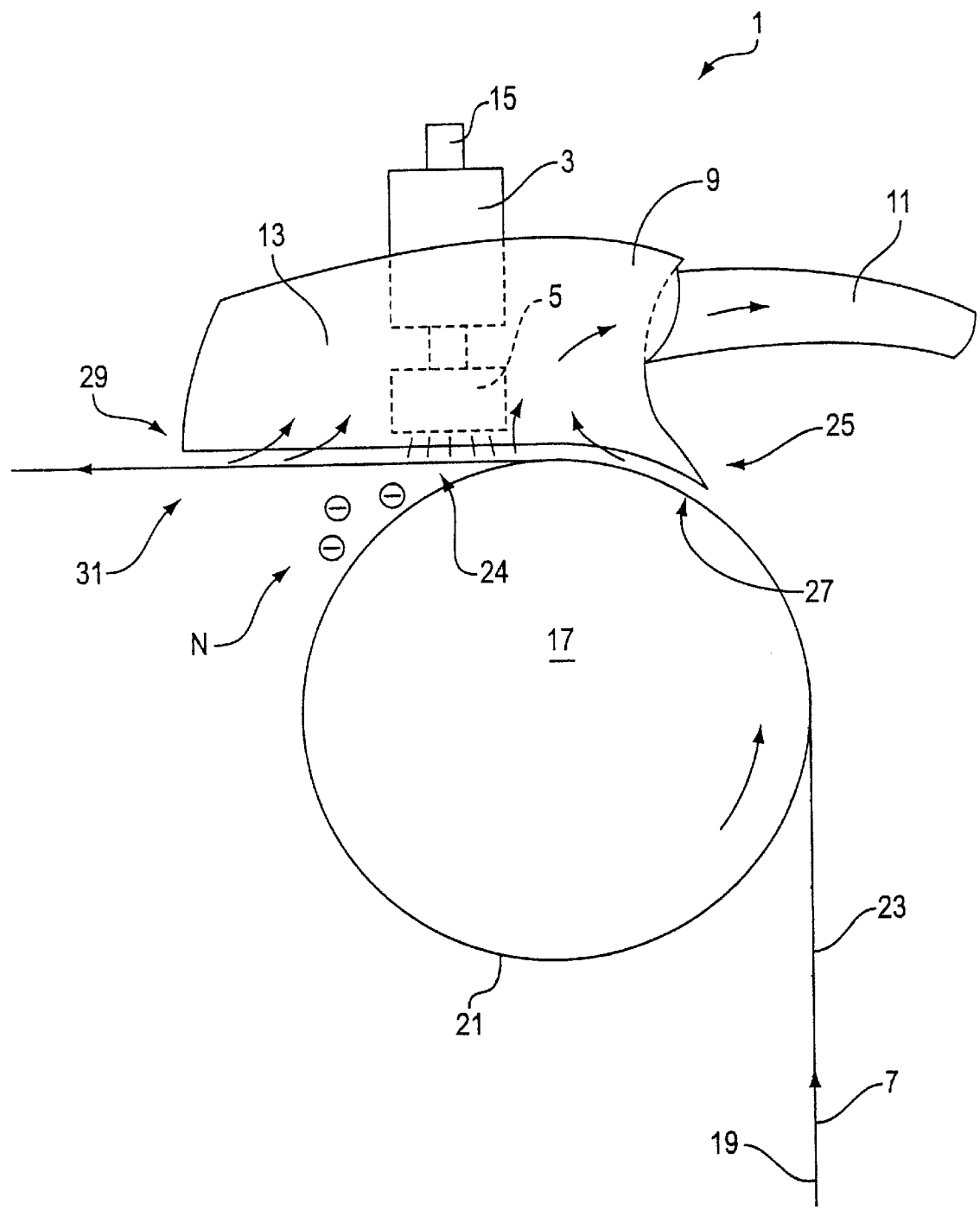
FIG. 1 is a schematic view, taken from the side, of a device of the invention, this device being for cleaning a transport belt of a machine for producing a web, which is not shown.

The particulars shown herein are by way of example and for purposes of illustrative discussion of the preferred embodiments of the present invention only and are presented in the cause of providing what is believed to be the most usefull and readily understood description of the principles and conceptual aspects of the invention. In this regard, no attempt is made to show structural details of the invention in more detail than is necessary for the fundamental understanding of the invention, the description taken with the drawing making apparent to those skilled in the art how the invention may be embodied in practice.

Agents suitable for use with the cleaning device of the invention include cleaning agents. The agents which may be used include fluids, including liquid and gaseous fluids. Cleaning agents which are suitable include liquid and gaseous cleaning agents. Water and steam, and cleaning agents comprising water and steam, may be employed.

The cleaning device of the invention is suitable for use with all conveyor or transport belts of web manufacturing and producing machines. Examples include screen belts, or felts of screens, or press or drying sections of paper or cardboard manufacturing machines. The following description, which is provided merely as a nonlimiting example, pertains to drying screen belts of a paper manufacturing machine.

As shown in the FIGS. 1–4, cleaning device 1 comprises a rotor nozzle. This rotor nozzle is depicted in the Figure as cleaning nozzle 3 with rotatable nozzle head 5, which presents a tuyere arrangement that is not depicted. This tuyere arrangement can be comprised of one or more propelling jets, from which a cleaning agent emerges tangentially to the transport belt surface and serves to create a rotating movement; in addition, one or more cleaning nozzles can be employed for spraying porous drying screen belt 7 with the cleaning agent.

Figure 4:
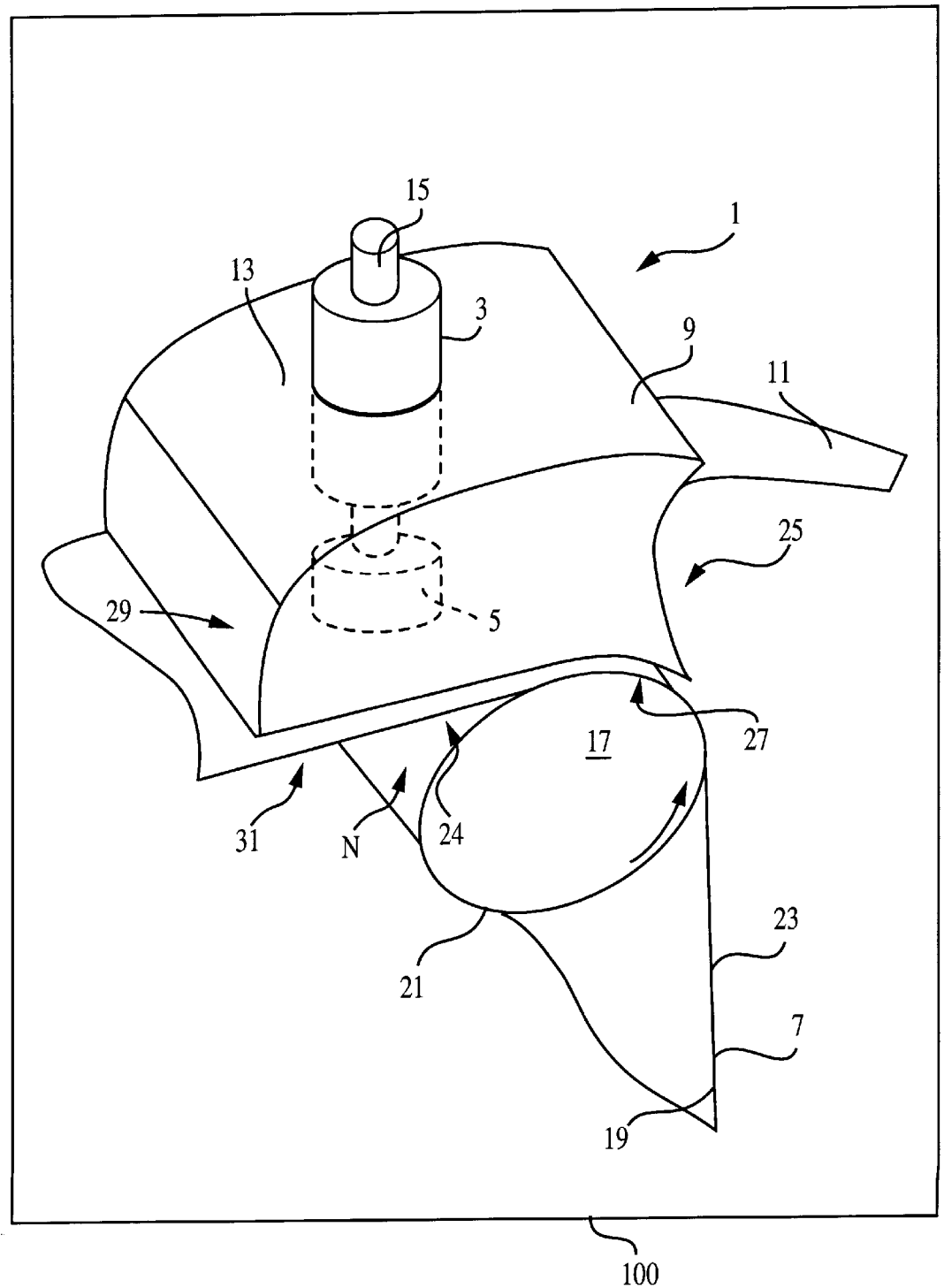
FIG. 4 is a perspective view of the device of the invention, wherein the suction bell of the device extends over the opening nip and wherein the cleaning nozzle of the device is located at least approximately in the middle of the suction bell, as viewed along the direction in which the transport belt runs.

FIG. 4 shows the cleaning device of the invention in a web manufacturing machine 100. Of course, as would be understood by one of ordinary skill, the cleaning device may be outside the web manufacturing machine.

Figure 2:
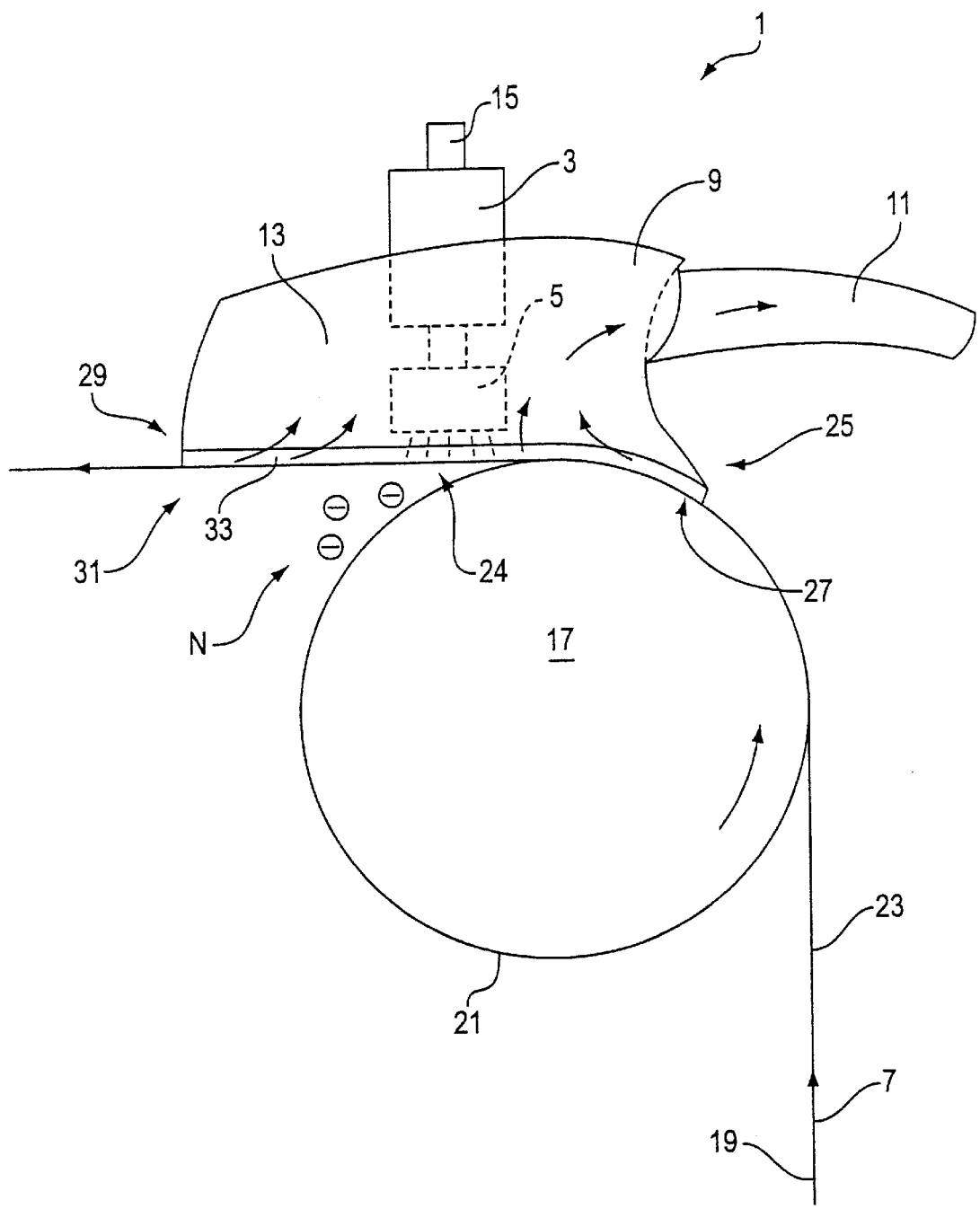
FIG. 2 is a schematic view, taken from the side, of the device of the invention as shown in FIG. 1, wherein the suction bell of the device comprises an elastic sleeve for sealing the suction chamber of the device off from the surrounding environment.
Figure 3:
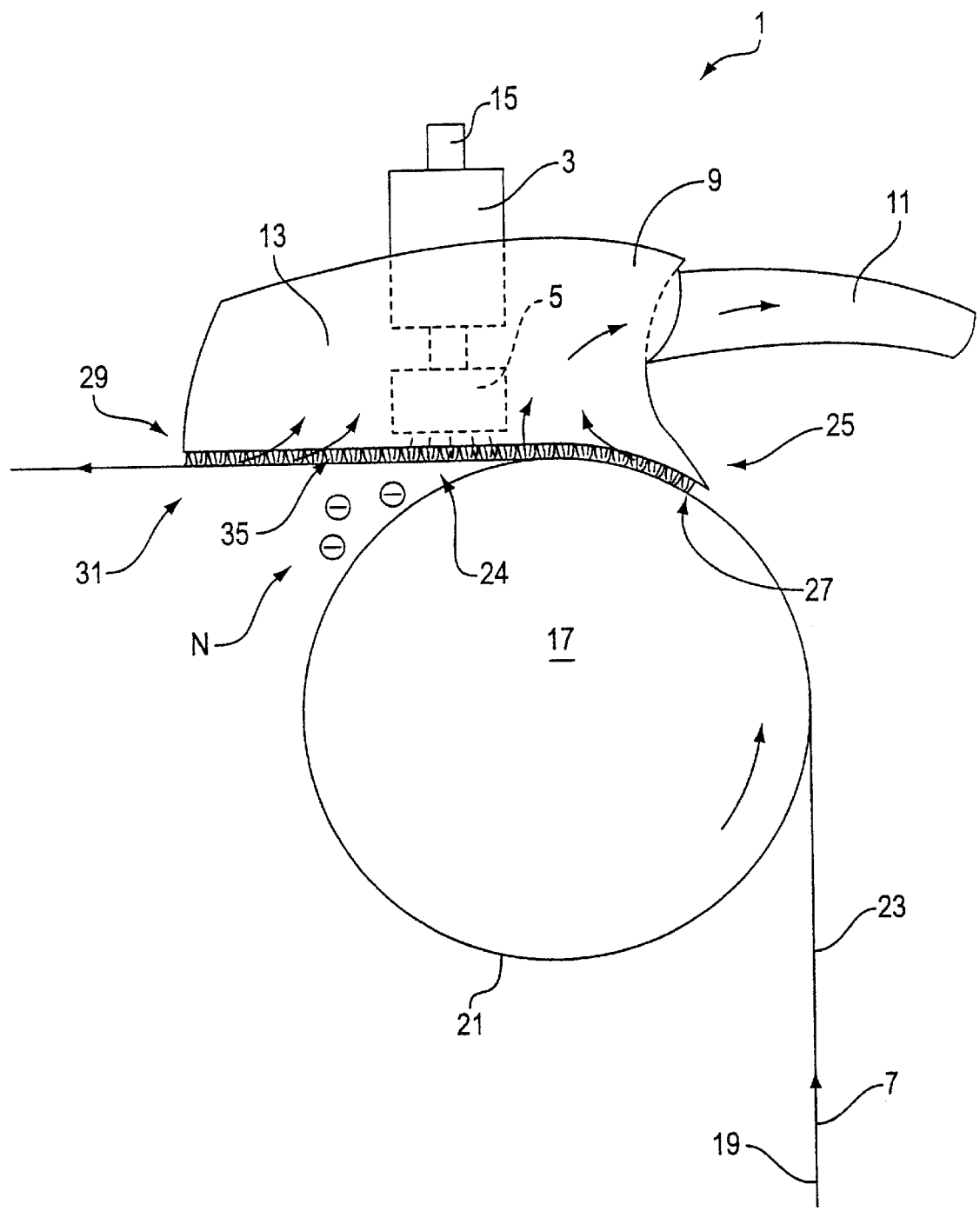
FIG. 3 is also a schematic view, taken from the side, of the device of the invention as shown in FIG. 1, wherein the suction bell of the device comprises a plurality of brushes for sealing the suction chamber of the device off from the surrounding environment.

In the embodiment depicted in FIGS. 1–4, cleaning nozzle 3 and nozzle head 5 are partially or completely encircled or encompassed by sleeve-shaped suction bell 9. The interior of suction bell 9 is coupled with suction line 11, and forms suction chamber 13 that is provided to cleaning nozzle 3. Preferably, suction bell 9 comprises or is provided with an elastic sleeve 33 as shown in FIG. 2, and/or with brushes 35 as shown in FIG. 3—e.g., two or more, or a plurality of brushes—that separate or seal off suction chamber 13 from the surrounding environment. Particularly, there can be a sleeve having an edge or periphery which is provided with brushes, which increase the cleaning effectiveness of the device, and also function as sealing elements.

Cleaning device 1 includes a connection or energy chain for supplying the cleaning agent to the cleaning nozzle. Of this connection, only extension 15, on cleaning nozzle 3, is depicted. A high pressure hose can be connected with a high pressure pump, and the high pressure hose can be attached to cleaning nozzle 3—more specifically, to extension 15—to supply fluid to cleaning nozzle 3. The energy chain for supplying the agent further comprises suction line 11. This line serves to drain splashed liquid—e.g., water—and/or vapor, along with dirt particles present in the liquid or vapor, from suction chamber 13.

Cleaning device 1 can be mounted on a traversing carriage not shown in FIGS. 1–4. This carriage preferably is movable in a direction which is diagonal to the direction in which drying screen belt 7 travels.

As can be seen in FIGS. 1–4, cleaning device 1 is associated with roll 17, around which drying screen belt 7 is guided. Drying screen belt 7 lies with its back or reverse side 19 on surface 21 of roll 17. In this regard, it is understood that reverse side 19 refers to the side of the belt that does not come into contact with the web; the reverse side can also be considered the side of the belt that contacts the roll. Correspondingly, it is understood that the front side of the transport belt is the side which is opposite to the reverse side. Further, the front side can be understood as the side of the belt that does not contact the roll, and as the side of the belt that contacts the web, particularly in the machine. Yet additionally, the front side of the belt can be understood as the side against which the cleaning agent is sprayed.

Cleaning device 1 is located in the area of opening nip N of roll 17, this being the area where drying screen belt 7 runs off of roll 17; specifically, the opening nip is where the drying screen belt runs off of the roll. A vacuum is built up in nip N, this vacuum being noted symbolically in the Figure by the "–" symbols.

In this embodiment of cleaning device 1, cleaning nozzle 3 is positioned vertically, or substantially vertically or essentially vertically, with respect to the surface of drying screen 7, so that jet 24, discharged from cleaning nozzle 3, impacts the drying screen belt surface vertically, at least partially, as indicated in the figure by a dashed line Drying screen belt 7, which runs off roll 17, is sprayed on its front side 23 with the cleaning agent from cleaning nozzle 3. As a result, coarse particles and dirt are detached from front side 23; this material is carried away from the surface of the drying screen belt by suction bell 9, as shown by the arrows in the Figure. At the same time, reverse side 19 of drying screen belt 7 is pressurized and suctioned by the vacuum acting in nip N. As a result, cleaning agent which has penetrated and permeated the drying screen belt 7, as well as the impurities within drying screen belt 7 and on its reverse side 19, are removed from drying screen belt 7.

Due to the location of cleaning nozzle 3 in opening nip N of roll 17, the vacuum acting there to clean the drying screen belt is advantageously used. Not only are the impurities in the drying screen belt thereby reduced, but there is also a reduction in the amount of the cleaning agent that permeates and remains in the drying screen belt during the cleaning process.

In another embodiment of the cleaning device of the invention, suction bell 9 merely borders the section of the drying screen belt that is to be cleaned, and the interior of the suction bell is not pressurized with a vacuum. The design of the cleaning device is thereby simplified and its operating costs are reduced.

Due to the advantageous positioning of cleaning device 1 in the area of the drying screen belt strand that is running off the roll, the supporting effect of immediately adjacent roll 17 is exploited during the cleaning process. In this manner, the deflection of the drying screen belt during the cleaning process is minimized.

As can be ascertained from FIGS. 1–4, suction bell 9 extends over at least a section or portion of the peripheral surface of the roll. Further, as shown in FIG. 4, viewed along the direction in which drying screen belt 7 runs, suction bell 9 likewise extends over opening nip N.

Suction bell 9 includes end section 25, facing drying screen belt 7. End section 25 is fitted to the circular and cylindrical periphery of roll 17, so as to ensure a specific and adjustable distance or opening between suction bell 9 and drying sleeve belt 7— particularly, between end section 25 and that portion of the belt which is both on the roll and under the suction bell. Preferably this distance or opening is constant, or generally or substantially or essentially constant, along edge 27 of end section 25. Specifically, it is edge 27 which both defines the bottom of end section 25, and also conforms in shape to and is spaced from the roll surface, thereby forming the indicated distance or opening.

Suction bell 9 also includes end section 29. This end section is fitted to drying screen belt 7—particularly, to that portion of this belt—running off roll 17, to provide a specific and adjustable distance or opening between suction bell 9 and drying screen belt 7—particularly, between end section 29 and that portion of the belt leaving the roll. Preferably, this distance or opening is constant, or generally or substantially or essentially constant, along edge 31 of end section 29. Specifically, it is edge 31 which both defines the bottom of end section 29, and also conforms in shape to and is spaced from the belt surface, thereby forming the indicated distance or opening.

Also as shown in FIG. 4, in this embodiment of the cleaning device the cleaning nozzle, viewed along the direction in which the drying screen belt runs, is positioned in the middle, or approximately in the middle, of the suction bell. It is also possible to vary the location of the cleaning nozzle within the suction bell. However, wherever the cleaning nozzle is thusly situated, as a matter of preference it is positioned to spray the drying screen belt with a cleaning agent in the opening nip. This is where the drying screen belt no longer lies on the surface of the roll; specifically, it is where the running belt leaves the roll, and continues in the direction away therefrom.

In an advantageous manner, a cleaning of the drying screen belt on both sides is achieved by using cleaning device 1, whereby both the cleaning action and the discharge of the cleaning agent from the drying screen belt mark an improvement over the results obtained with known devices. A further advantage of the cleaning device in accordance with the invention lies in the fact that those disturbances which occur while cleaning is conducted during the production or manufacturing of the web—for example, the remoistening of the web—are reduced, while the amount of water which is used remains the same.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A device which cleans a transport belt of a web manufacturing machine, comprising:
   at least one cleaning nozzle for spraying the transport belt with a cleaning agent;
   said belt being guided around a roll of said web manufacturing machine to define an entry nip and an opening nip, said opening nip being disposed downstream from said entry nip in a direction of travel of said transport belt;
   said cleaning nozzle being located at the opening nip of the roll around which the transport belt is guided; and
   a central axis of a flow of said cleaning agent from said cleaning nozzle intersecting said roll, and intersecting said belt at a point at which said belt does not contact said roll.

2. The device according to claim 1, wherein the transport belt comprises at lease one of a dry screen belt, a wet screen belt, and a felt belt.

3. The device according to claim 1, wherein the belt can carry at least one member selected from the group consisting of a paper web and a cardboard web.

4. The device according to claim 1, wherein the at least one cleaning nozzle is positioned to spray the side of the transport belt that comes into contact with a web.

5. The device according to claim 1, further comprising a suction chamber for effecting removal of material from the transport belt by a jet stream, for vacuuming the material into the suction chamber, and for discharging the material.

6. The device according to claim 5, further comprising a suction bell that forms the suction chamber and encompasses the cleaning nozzle.

7. The device accord to claim 6, wherein the suction bell comprises an elastic sleeve for sealing the suction bell off from the surrounding environment.

8. The device according to claim 6, wherein the suction bell comprises a plurality of brushes for sealing the suction bell off from the surrounding environment.

9. The device according to claim 6, wherein the suction bell comprises a first section fitted to the roll surface, this first section comprising an edge which defines the bottom of the first section, which conforms in shape to the roll surface, and which is spaced from the roll surface, to provide a specific and adjustable distance between the first section and the portion of the transport belt which is on the roll and is under the suction bell.

10. The device according to claim 6, wherein the suction bell comprises a section fitted to the portion of the transport belt running off the roll, this section comprising an edge which defines the bottom of the section, which conforms in shape to the portion of the transport belt running off the roll, and which is spaced from the portion of the transport belt running off the roll, to provide a specific and adjustable distance between the section and the portion of the transport belt running off the roll.

11. The device according to claim 6, wherein the suction bell extends over at least a portion of the peripheral surface of the roll.

12. The device according to claim 11, wherein the suction bell extends over the opening nip, as viewed along the direction in which the transport belt runs.

13. The device according to claim 6, wherein the cleaning nozzle is located at least approximately in the middle of the suction bell, as viewed along the direction in which the transport belt runs.

14. The device of claim 1, further comprising said central axis being substantially perpendicular to said belt.

15. A device which cleans a transport belt of a web manufacturing machine, comprising:

at least one cleaning nozzle for spraying the transport belt with a cleaning agent;

said belt being guided around a roll of said web manufacturing machine to define an entry nip and an opening nip, said opening nip being disposed downstream from said entry nip in a direction of travel of said transport belt;

said cleaning nozzle being located at the opening nip of the roll around which the transport belt is guided; and a central axis of a flow of said cleaning agent from said cleaning nozzle being substantially perpendicular to said belt and intersecting said roll.

* * * * *